United States Patent
Kibler et al.

(10) Patent No.: US 8,210,911 B2
(45) Date of Patent: Jul. 3, 2012

(54) CASING BRAKE AND METHOD OF ADJUSTING THE SAME

(75) Inventors: Armin Kibler, Eberhardzell (DE);
Bernd Maile, Oggelshausen (DE);
Thomas Waizenegger, Ummendorf (DE)

(73) Assignee: Albert H. Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 13/078,037

(22) Filed: Apr. 1, 2011

(65) Prior Publication Data

US 2011/0244771 A1    Oct. 6, 2011

(30) Foreign Application Priority Data

Apr. 1, 2010  (EP) .................................. 10003668

(51) Int. Cl.
*A01K 11/00*    (2006.01)
(52) U.S. Cl. ........................................................ 452/32
(58) Field of Classification Search ............. 452/30–32, 452/35–37, 46–48, 51
See application file for complete search history.

(56) References Cited

U.S. PATENT DOCUMENTS

| | | | | |
|---|---|---|---|---|
| 7,455,578 B2 * | 11/2008 | Maile et al. | ..................... | 452/37 |
| 7,597,613 B2 * | 10/2009 | Staudenrausch | ................ | 452/32 |
| 7,704,130 B2 * | 4/2010 | Hanten et al. | ................... | 452/32 |
| 2002/0011730 A1 | 1/2002 | Stickan | | |

FOREIGN PATENT DOCUMENTS

| | | |
|---|---|---|
| DE | 3427745 A1 | 2/1986 |
| EP | 0247462 A1 | 12/1987 |
| EP | 1886572 A1 | 2/2008 |
| GB | 1 443 487 A | 7/1976 |

OTHER PUBLICATIONS

European Search Report for EP 10003668.0 dated Oct. 6, 2010.

* cited by examiner

*Primary Examiner* — Richard Price, Jr.
(74) *Attorney, Agent, or Firm* — Marshall, Gerstein & Borun LLP

(57) ABSTRACT

A casing brake and method of adjusting the casing brake, to allow the casing brake to be adjusted by hand, without making use of any tools, and to guarantee simultaneously that the casing brake cannot be displaced during operation. The casing brake includes a brake ring, inner and outer shells between which the brake ring is tensioned, and a locking element provided between said inner and outer shells, the locking element connected to said inner or outer shell and establishing a positive or a frictional connection with the respective other shell at a locked position, and further having an actuating device for eliminating the positive or the frictional connection.

41 Claims, 7 Drawing Sheets

CASING BRAKE AND METHOD OF ADJUSTING THE SAME

CROSS-REFERENCE TO RELATED APPLICATION

The present application claims the benefit of priority of European Application No. 10003668.0, filed Apr. 1, 2010. The entire text of the priority application is incorporated herein by reference in its entirety.

FIELD OF THE DISCLOSURE

The present disclosure relates to a casing brake, such as used in meat production applications, as well as to a method of adjusting the same.

BACKGROUND

In automatic sausage production processes, the casing is first applied to the filling tube at the discharge end of the machine. Subsequently, the casing brake is positioned on the filling tube end.

Casing brakes are used for holding the casing under tension at the filling site, i.e. at the filling tube end, when it is being filled with a certain substance (e.g. sausage meat). This is a prerequisite for the production of high-quality, tightly stuffed sausages. If the casing can, however, be removed too easily from the filling tube during the filling process, a poor degree of filling will be obtained.

In addition, the casing brake supports the rotation of the still unstuffed casing on the filling tube together with said filling tube during the twist-off operation, whereas the already stuffed part of the casing does not rotate together therewith due to mass inertia and due to the fact that it is fixed in position. By means of this relative movement, a twist-off point is produced at the site of the casing brake, i.e. the sausage is formed in the right portions.

Such a casing brake with a brake pad, which presses the casing onto the filling tube from outside, is already known from EP 0247462 (see FIGS. 12 and 13, showing a casing brake of this kind). The brake pad is a component of the casing brake. The sealing lip of the brake pad is directed inwards towards the filling tube. The conical brake pad is axially tensioned between two shells. This is normally done via a thread provided between these shells. By tensioning the brake pad via a bevel, the diameter of the sealing lip can be modified and the braking force can be adjusted in this way. In view of the high dynamics, starting/stopping entails the risk that the adjustment of the rotating parts will, due to mass inertia, change during production. A change in the brake pretension should, however, be avoided under all circumstances. Hence, the adjustment is normally configured such that it cannot take place easily. Normally, the friction in the thread is increased by a rubber ring to such an extent that an inertia-dependent displacement is no longer possible. This, however, means that easy adjustment by hand, without the use of special tools, will no longer be possible either.

SUMMARY OF THE DISCLOSURE

Taking this as a basis, it is one aspect of the present disclosure to provide a casing brake as well as a method of adjusting the same, which allow the brake tension to be adjusted by hand without making use of any tools, and which simultaneously guarantee that a readjustment of the casing brake, caused in particular by mass inertia, will be prevented during operation.

According to the present disclosure, the casing brake comprises a locking element provided between the inner and outer shells, said locking element being connected either to said inner or said outer shell and establishing a positive and/or a frictional connection with the respective other shell at a locking position. The casing brake further comprises an actuating device for eliminating the positive or the frictional connection. The actuating device is either a part of the locking element or it is connected thereto.

It follows that, during operation, the locking element occupies the locking position thus preventing an inertia-dependent, undesired displacement of the position of the shells relative to one another in the axial direction, i.e. in particular a rotation of the shells relative to one another and, consequently, a readjustment of the braking force. A rotation of the shells relative to one another about their central axis can therefore be prevented by the positive connection or the frictional connection. The braking effect can thus be adjusted easily, without making use of any tools, preferably in connection with a driven casing brake, which rotates together with the filling tube about the central axis so as to produce a twist-off point. The casing brake may, however, also be a non-driven casing brake. Via the actuating device, the casing brake can easily be unlocked by hand and the braking tension can be adjusted. The locking element also allows the set braking tension to be maintained for various calibers, e.g. by making use of a respective separate casing brake for each caliber. The brake pretension adjusted can also be maintained when the brake is removed. The whole casing brake can then be arrested in the brake ring gear unit by means of a snap fit. Taking all this into account, simple mounting and demounting is accomplished. In addition, due to easy cleaning possibilities, an improved hygienic situation is obtained. The respective adjusted position can reliably be arrested via a positive connection or a frictional connection.

According to a preferred embodiment, the locking element is a resilient or an elastic element. A suitable elastic element is e.g. also an element consisting of an elastic material, such as rubber, having incorporated therein a stabilizing element, e.g. a pin. The use of suitable locking elements allows to change easily between a locked position and a non-locked position by operating an actuating device.

It is also possible to produce one of the shells from a flexible material so that the locking element is integrated in the shell, i.e. formed integrally with the shell. Such a device is particularly easy to produce.

According to a preferred embodiment, the position which the shells occupy relative to one another in the axial direction can be adjusted by means of a thread such that the tension of the brake ring can be adjusted by rotating the shells relative to one another, such rotation of the shells relative to one another being excluded at the locked position. This means that, during operation of a driven casing brake, the shells cannot rotate relative to one another and that it is also impossible to rotate them relative to one another by hand, when the casing brake is at a standstill.

Preferably, the locking element is provided with a portion which, at the locked position, lockingly engages a recess then formed in the first inner or in the outer shell, thus establishing a positive connection. It is, however, also possible that the locking element is provided with a portion which, at the locked position, applies pressure to a friction area provided on the inner or the outer shell, a frictional connection being thus established between said portion and said friction area.

The friction between said portion and the friction area is so high that the shells are sufficiently fixed relative to one another, so that the braking force will not readjust itself during operation and cannot be readjusted by hand either.

For changing the set braking force, the actuating device has to be operated, in particular by means of the force of human fingers. This can easily be done by pressing or drawing the actuating device. The use of a special tool, which is required in the prior art, is here not necessary.

In order to allow the locking element to lockingly engage the respective shell, a plurality of recesses, e.g. in form of notches, holes, grooves, is uniformly distributed over the circumference of the inner or outer shell. It follows that, when the actuating device is no longer operated, e.g. no longer pressed down, the locking element can snap into position at the next possible site, e.g. by continuing the rotary movement thereof. Alternatively, a plurality of friction areas, advantageously one continuous friction area, can be arranged on the circumference of said inner or outer shell. When the actuating device is no longer operated, the locking element can establish a frictional connection with the respective shell at the next possible site.

A specially preferred embodiment is so conceived that, in the fully mounted operating condition, the inner shell projects beyond the outer shell by at least 2 mm, preferably by at least 1 cm, i.e. at least to such an extent that the projecting portion can easily be taken hold of by hand. The inner shell can thus be grasped with the fingers via this collar. This is also the area where an opening is provided through which the actuating element is exposed so that it can be operated. This combination is very advantageous, since, while the outer shell can be grasped e.g. for rotating the shells relative to one another, the actuating device can simultaneously be operated with one finger so as to unlock the brake. When at least one sight opening is provided in this projecting area or collar of the inner shell, it can be guaranteed that the filling tube will be visible. To this end, the inner shell should project by at least 5 mm.

In accordance with the method of adjusting a casing brake according to the present disclosure, the locking element is first unlocked by operating the actuating device, whereby the positive connection or the frictional connection between the locking element and the inner or the outer shell is eliminated. When the locking element has been unlocked, the braking tension can be adjusted by changing the position of the shells relative to one another in the axial direction, in particular by rotating the shells relative to one another. By tensioning the brake ring, the diameter of the sealing lip can be changed and the braking force can be adjusted in this way. Subsequently, the locking element can be locked again, said locking element establishing then with the inner or the outer shell a positive connection or a frictional connection such that the position of the shells relative to one another in the axial direction can no longer be changed, in particular such that the shells can no longer be rotated relative to one another.

According to the present disclosure, the actuating device is operated still further for adjusting the braking force and no longer operated for the purpose of locking. This course of action provides maximum safety.

The actuating device can especially be operated by means of the force of human fingers, in particular by means of pressing or drawing. The force required is less than 100 N or so small that the use of a special tool can be dispensed with.

At the locked position, the shells can preferably no longer be rotated relative to one another, i.e. they can no longer be adjusted by means of the thread. It is, however, also possible that, according to another embodiment, the relative position of the outer and inner shells is not adjusted by means of a thread but by means of sliding surfaces that rest on one another. In this case, it will be advantageous when the locking element is configured such that a positive connection or a frictional connection is obtained at the locked position, so that the shells will be fixed additionally or alternatively in the axial direction. To this end, the shell in question has provided thereon a plurality of successively arranged arresting means, e.g. recesses, or a friction area extending in the axial direction.

BRIEF DESCRIPTION OF THE DRAWINGS

The present disclosure will be explained in more detail herein below making reference to the following figures.

DETAILED DESCRIPTION OF THE PREFERRED EMBODIMENT

Figure 1:
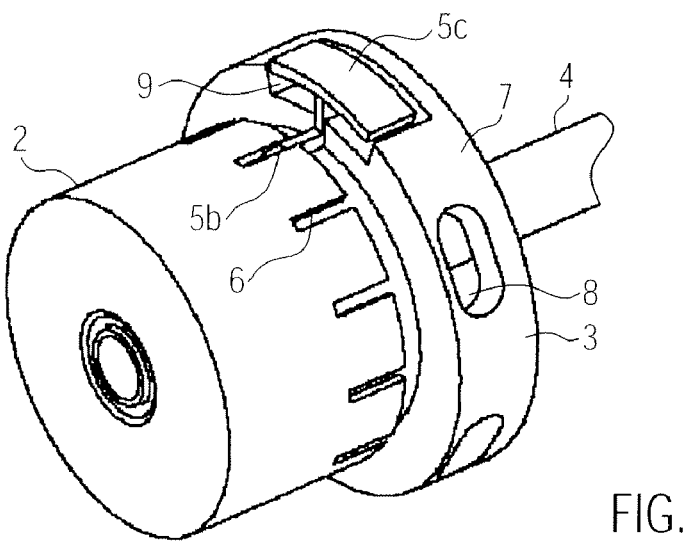
FIG. 1 shows a perspective view of a first embodiment according to the present disclosure.

FIG. 1 to 4 show a first embodiment of a casing brake according to the present disclosure. Reference numeral 4 stands for a filling tube used for conveying, in the manner known, a paste-like substance into a casing pulled onto the filling tube 4. The filling tube has supplied thereto via a hopper, which is not shown, and a portioning device, which is not shown either, a paste-like substance in portions, as is generally known and as will here not be explained once more. In automatic sausage production processes, the casing is first applied to the filling tube 4 at the free end 4a thereof. Following this, the casing brake is positioned at the filling tube end 4a in the manner known. Depending on the respective embodiment, the filling tube 4 can be supported rotatably and, if desired, it may be driven by means of a drive, which is not shown, such that it rotates about the centre axis L so as to produce a twist-off point. The casing brake according to the present disclosure may, however, also be a non-driven casing brake.

The casing brake comprises an inner shell 3 and an outer shell 2 between which the elastic brake ring 1, e.g. a brake pad, is tensioned. The shells 2, 3 can tension the brake ring axially and/or radially. The brake ring 1 is arranged concentrically with the filling tube 4. Also the shells 2, 3 are arranged concentrically with the filling tube 4. The brake ring is inserted between the shells 2, 3. The brake ring 1 is substantially conical in cross-section and presses the casing onto the filling tube 4 with its sealing lip 1a. The sealing lip 1a of the brake ring 1 is directed at an oblique angle inwards towards the filling tube. At its broader end, the brake ring 1 is provided with an oblique end face 1b, which comes to lie on an oblique surface of the shell 3. The shell 2 applies pressure to the upper surface 1b of the conical brake ring 1. By tensioning the brake ring between the shells 2 and 3, i.e. by changing the position of the shells 2, 3 relative to one another in the axial direction, the braking pressure and, consequently, the diameter of the sealing lip 1a can be modified and adjusted. Preferably, the shells are adjusted via a thread 11, which is here only shown schematically, by rotating the two shells 2, 3 relative to one another.

Figure 4:
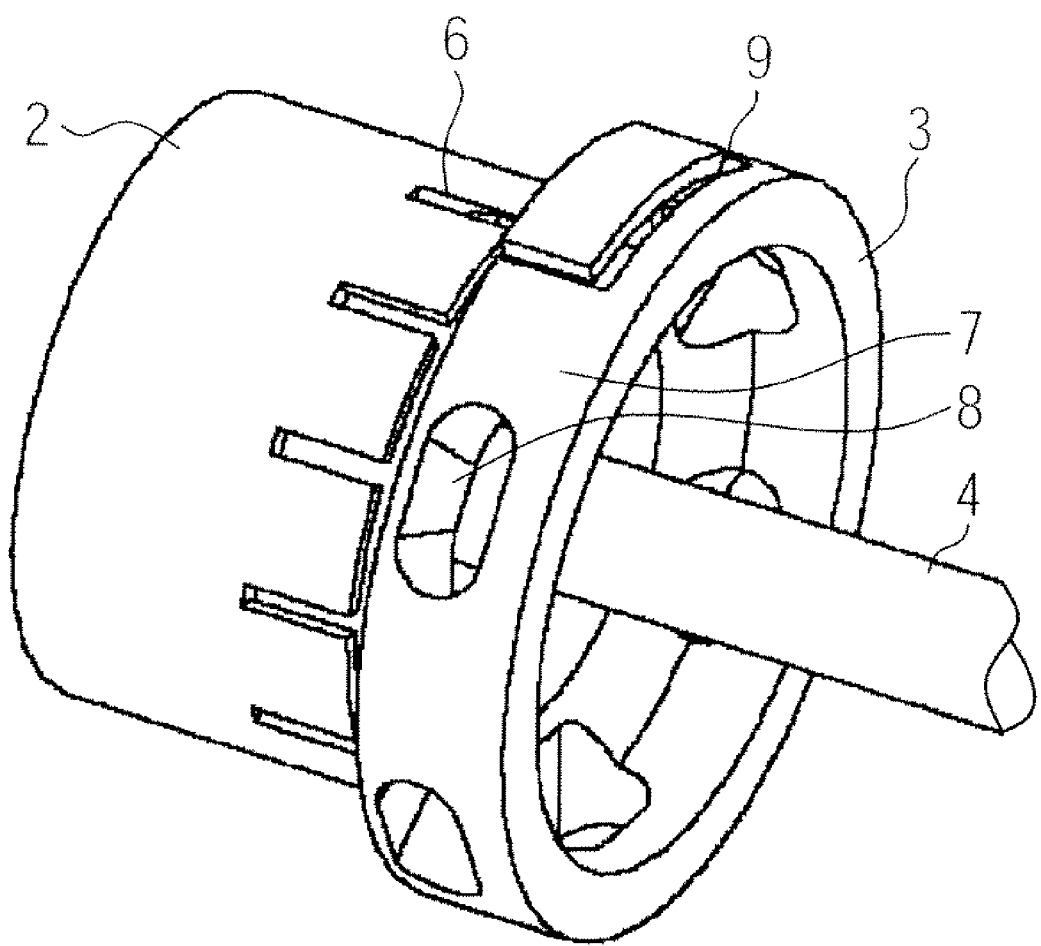
FIG. 4 shows another perspective view according to the first embodiment of the present disclosure.

As can especially be seen from FIGS. 1 and 4, the shells 2, 3 are configured such that, in the fully mounted operating condition, the inner shell 3 projects beyond the outer shell 2 by at least 2 mm, preferably at least 1 cm. As can be seen from FIGS. 1 and 4, the inner shell 3 has in this area, e.g. at least in certain sections thereof, a diameter which is larger than that of the outer shell 2. Hence, the inner shell 3 can easily be taken hold of for the purpose of rotating the shells 2, 3. In the area projecting beyond the outer shell 2, the inner shell 3 has a plurality of sight openings 8 which guarantee that the filling tube will be visible.

Figure 2:
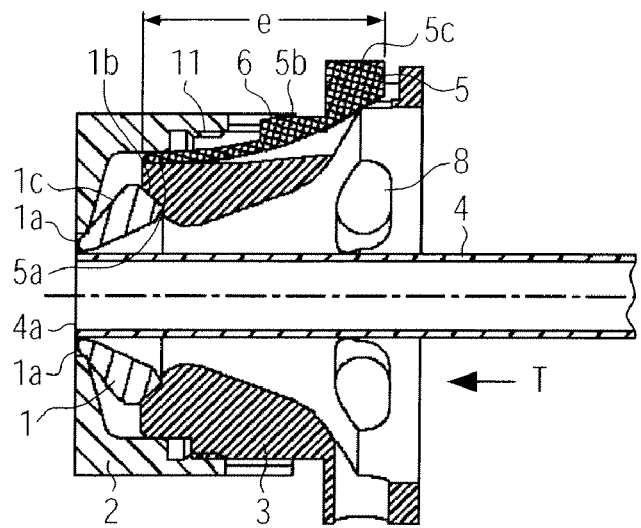
FIG. 2 shows a longitudinal section through the embodiment shown in FIG. 1, at a locked position.
Figure 3:
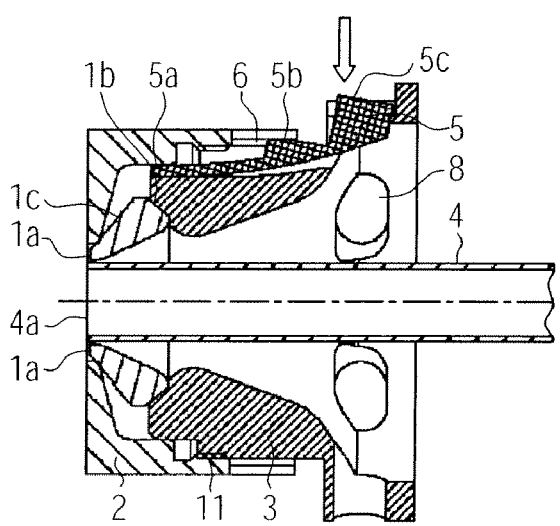
FIG. 3 shows the embodiment shown in FIG. 2, at an unlocked position.

As shown in a particularly clear manner in FIGS. 2 and 3, a locking element 5 is provided between the shells 2 and 3. The locking element 5 is especially implemented as a resilient or elastic element. Materials which are adapted to be used for the resilient element 5 are e.g. spring steel, plastic or an elastomer. The elastic material may additionally have incorporated therein a reinforcing element, e.g. a pin. The locking element 5 is fixedly connected to the inner shell 3 e.g. by means of an adhesive, screws, rivets, or by means of potting. The locking element 5 is elongate in shape and has a length l of such a nature that elastic deformation is possible. The width of the locking element (dimension at right angles to the length l shown) and the radially extending height are to be dimensioned depending on the material used in the case in question.

The locking element 5 is provided with a portion 5b which is implemented as a projection, i.e. which extends here from the locking element 5 from the centre axis L radially outwards. For establishing a positive connection between the portion 5b of the locking element 5 and the outer shell 2, said outer shell is provided with at least one opening 6, e.g. in the form of a groove 6, a notch, a hole, etc., in which the portion 5b can snap into place so as to establish a positive connection. As can be seen from FIGS. 1 and 2, the portion 5b of the locking element is in locking engagement with the recess 6 at a locked position. Due to the positive connection established between the lateral edges of the portion 5b and the lateral inner edges of the recess, shells 2, 3 are secured against rotation relative to one another. The length of a recess 6 in the axial direction exceeds the length of the portion 5b so as to guarantee that the portion 5b can snap into place at different positions of the shells relative to one another. In the case of this embodiment, a plurality of recesses 6 is uniformly distributed over the inner circumference of the outer shell 2 in an advantageous manner. Hence, a rotation of the two shells during the production process is prevented by the locking element that has been snapped into place. A movement of the shells in the axial direction is prevented by means of the thread.

Furthermore, the locking element 5 comprises an actuating device 5c which, as shown here, is part of the locking element 5 and formed integrally with the locking element, or which is formed on the locking element. Via the actuating device 5c the positive engagement between the portion 5b and the recess 6 can be eliminated, e.g. by applying pressure to said actuating device 5c, as can especially be seen from FIG. 3. When the resilient or elastic element 5 is pressed, the portion 5b moves inwards towards the longitudinal axis L so that the positive engagement will be eliminated. The portion 5b will then no longer engage the recess 6. Hence, the shells 2, 3 can again be rotated relative to one another so as to adjust the pretension of the brake ring 1.

According to this embodiment, the section of the inner shell 3 projecting beyond the outer shell 2 is provided with an opening 9 through which the actuating device 5c is exposed. As can especially be seen from FIG. 1, the actuating device 5c is provided with a planar upper portion that can simply be pressed down by a human finger. It follows that, making use of the collar area 7, the inner shell can be grasped and rotated with the fingers while pressure is simultaneously applied to the actuating device 5c. When the actuating device 5c has no longer applied thereto any pressure, the locking element 5, i.e. the portion 5b, will snap into place at the next possible site 6, as can be seen in FIG. 2.

Figure 5:
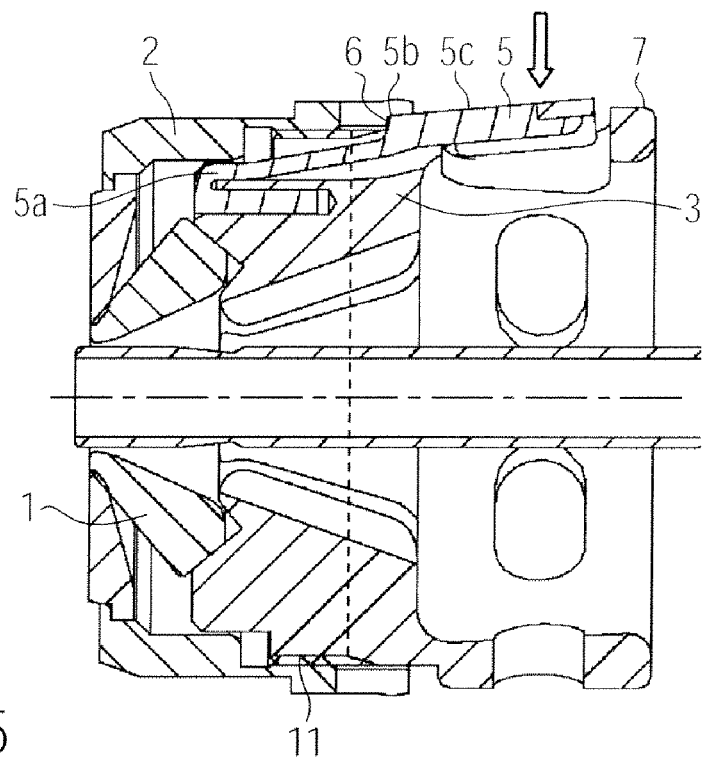
FIG. 5 shows a longitudinal section through a casing brake according to a first embodiment of the present disclosure.
Figure 6:
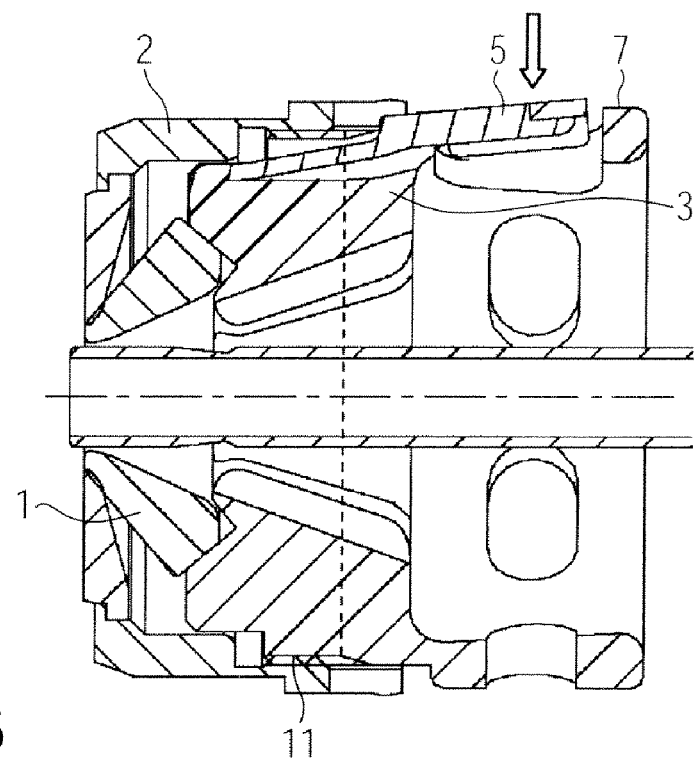
FIG. 6 shows a longitudinal section through a second embodiment according to the present disclosure, at a locked position.

The embodiment shown in FIG. 5 corresponds to the first embodiment at the locked position; also in this case, a portion 5b establishes a positive connection with a recess 6. FIG. 5 shows clearly that the locking element 5 is anchored in the inner shell 3 via the fastening portion 5a. As can be seen from FIG. 6, the locking element 5 may also be formed integrally with the inner shell 3. To this end, the outer shell 2 is produced from an elastic material, such as plastic or spring steel.

Figure 7:
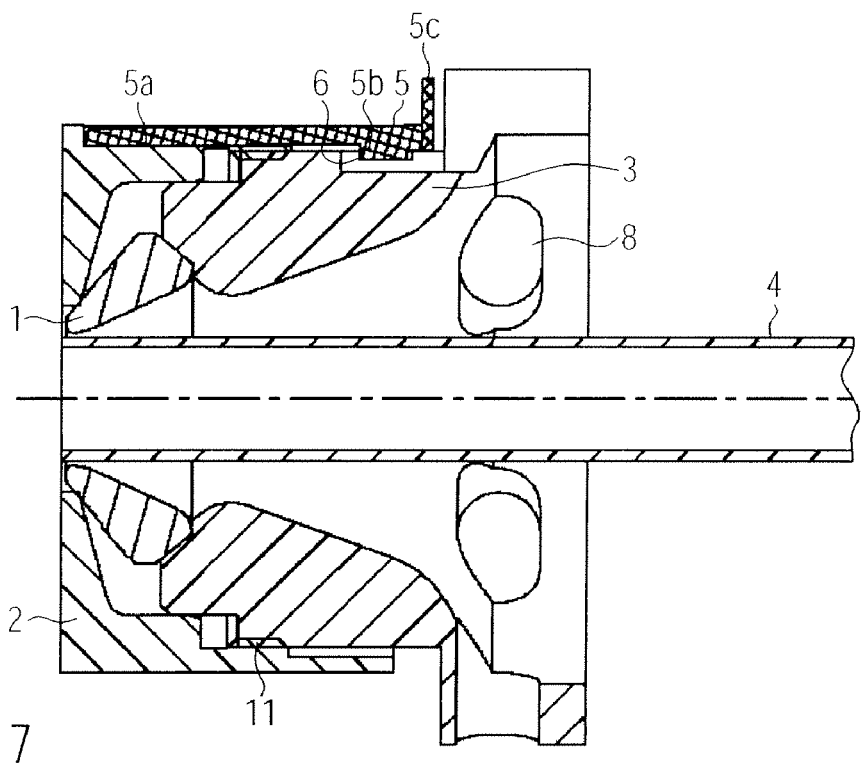
FIG. 7 shows a longitudinal section through a casing brake according to a third embodiment, at a locked position.
Figure 8:
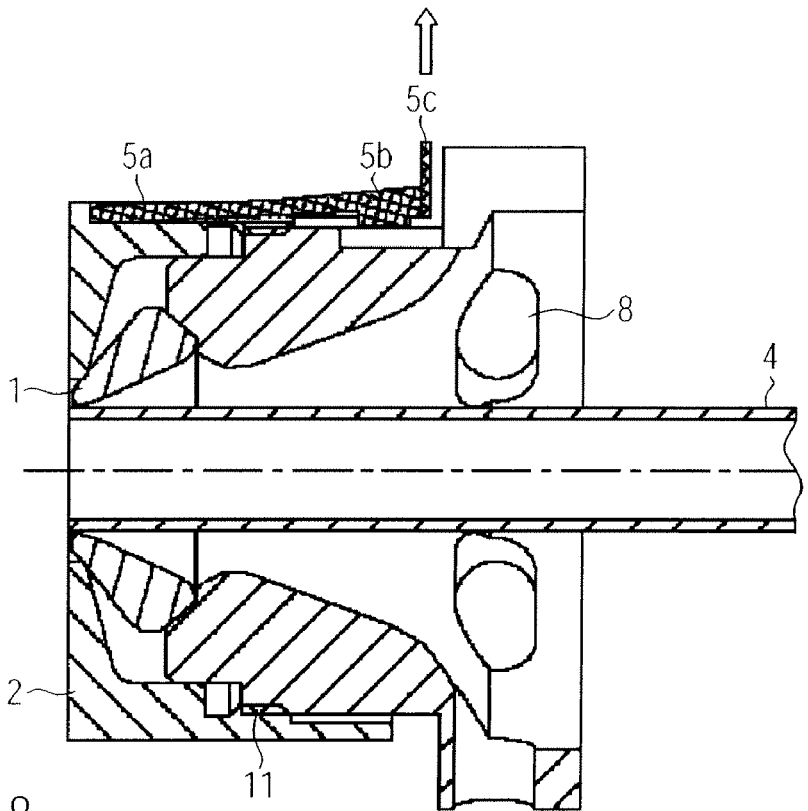
FIG. 8 shows the casing brake shown in FIG. 7, at an unlocked position.
Figure 9:
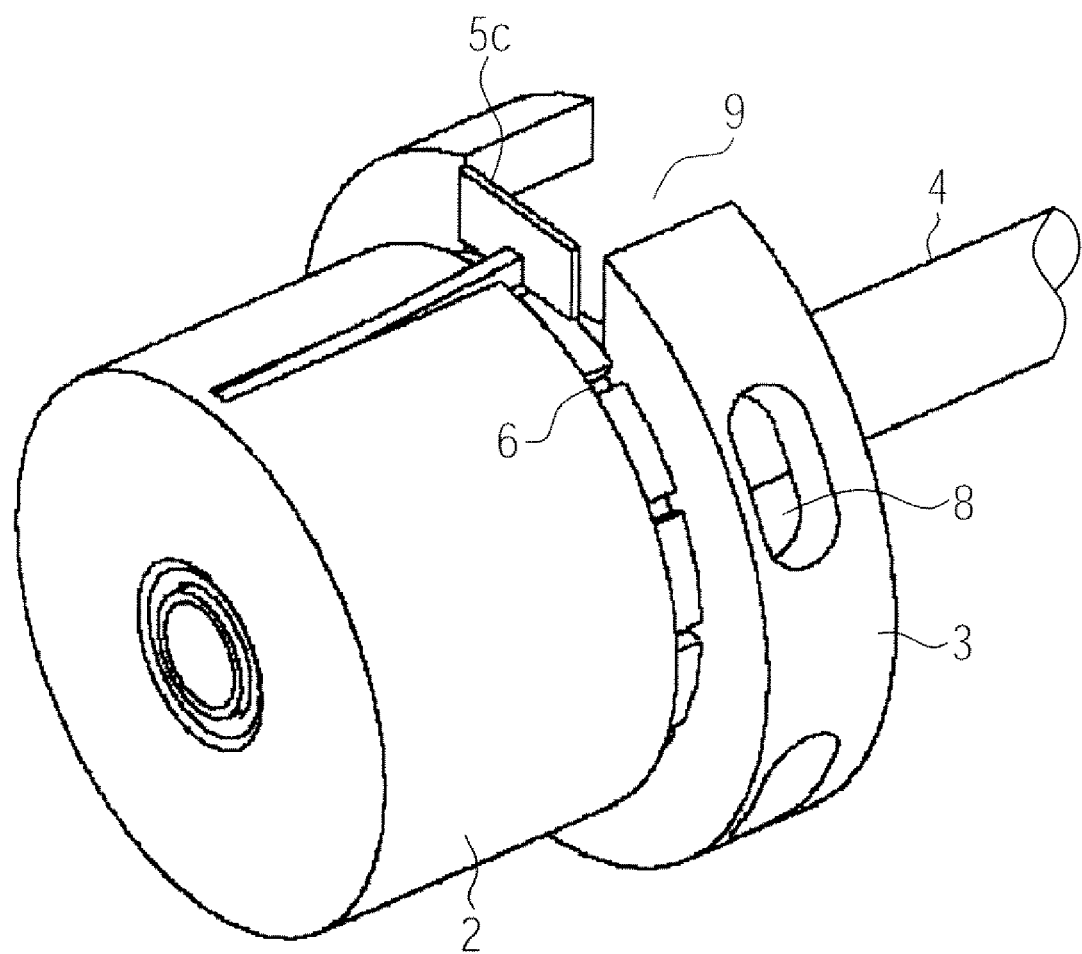
FIG. 9 shows the embodiment shown in FIGS. 7 and 8, in a perspective view.

FIGS. 7 to 9 show a third embodiment of the present disclosure. This embodiment corresponds to the casing brake which has been described in connection with the first embodiment, with the exception that the locking element 5 is here not secured to the inner shell 3 but to the outer shell 2. Also in this case, the locking element is fixed to the outer shell 2 via the fastening portion 5a. The locking element 5 comprises also in this embodiment a projection 5b which can be snap into place in a complementary arresting means 6 provided in the inner shell so as to establish a positive connection between the locking element 5 and the complementary recess 6. Just as in the case of the preceding embodiments, the lateral edges of the portion 5b establish a positive connection with the inner lateral edges of the recess 6 such that the shells 2, 3 cannot be rotated relative to one another about the longitudinal axis L. In correspondence with the first embodiment, the locking element 5 is again provided with an actuating device 5c for eliminating the positive connection. As can especially be seen from FIG. 8, the actuating device 5c, which is also here exposed by an opening 9 in the collar area, can be drawn upwards by a human finger, as shown by the arrow in FIG. 8. This will have the effect that the portion 5b moves out of the recess 6, so that the two shells 2, 3 can again be moved relative to one another by rotating them relative to one another about the axis L.

Also in this embodiment a plurality of recesses 6 is arranged around the outer circumference of the inner shell 3, as can best be seen from FIG. 9. It follows that, when the actuating device 5c is no longer raised, the portion 5b of the locking element 5 can again snap into place at the next possible site.

Figure 10:
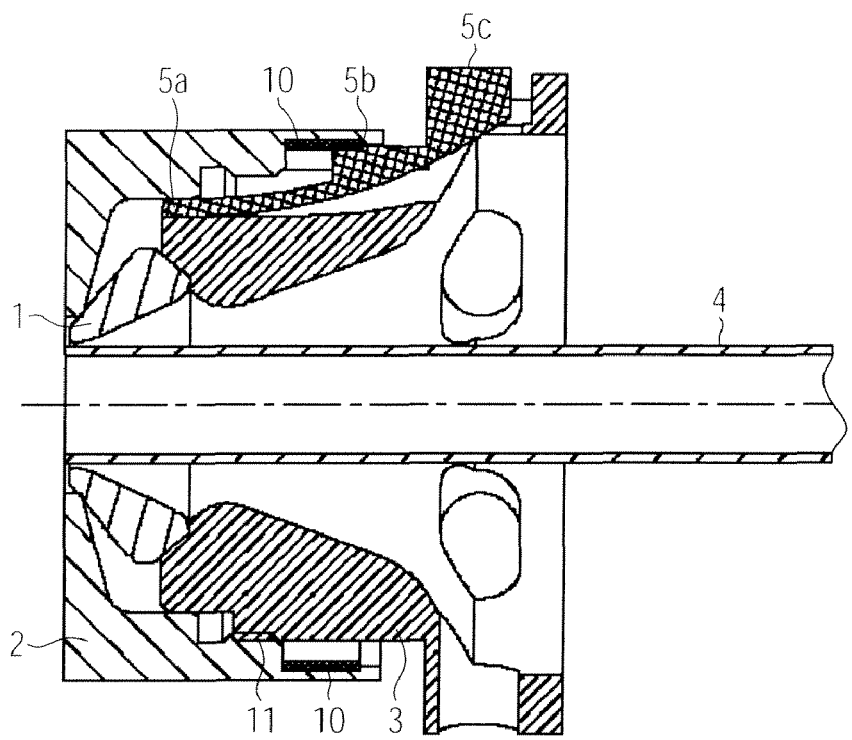
FIG. 10 shows a longitudinal section through a casing brake according to a fourth embodiment of the present disclosure, at a locked position.
Figure 11:
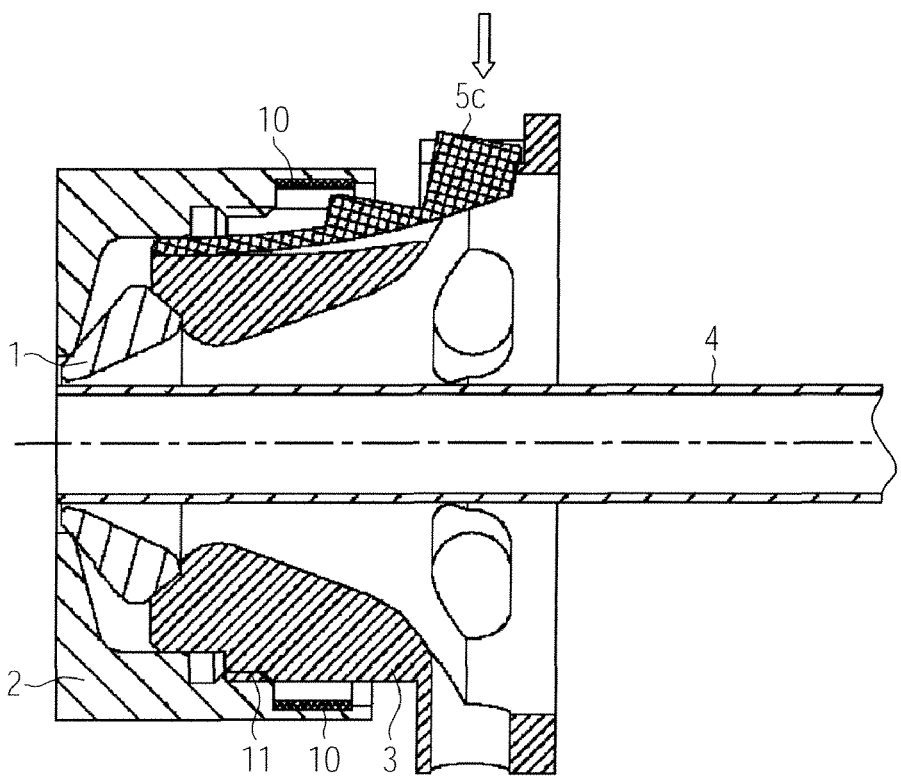
FIG. 11 shows the casing brake shown in FIG. 10, at an unlocked position.
Figure 12:
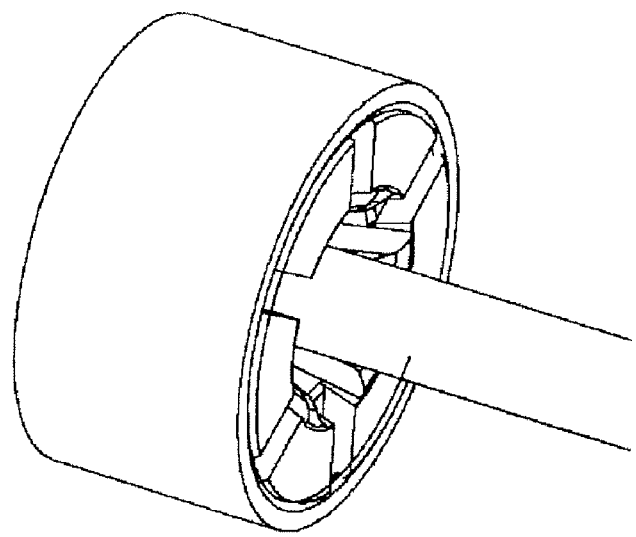
FIG. 12 shows a perspective view of a casing brake according to the prior art.
Figure 13:
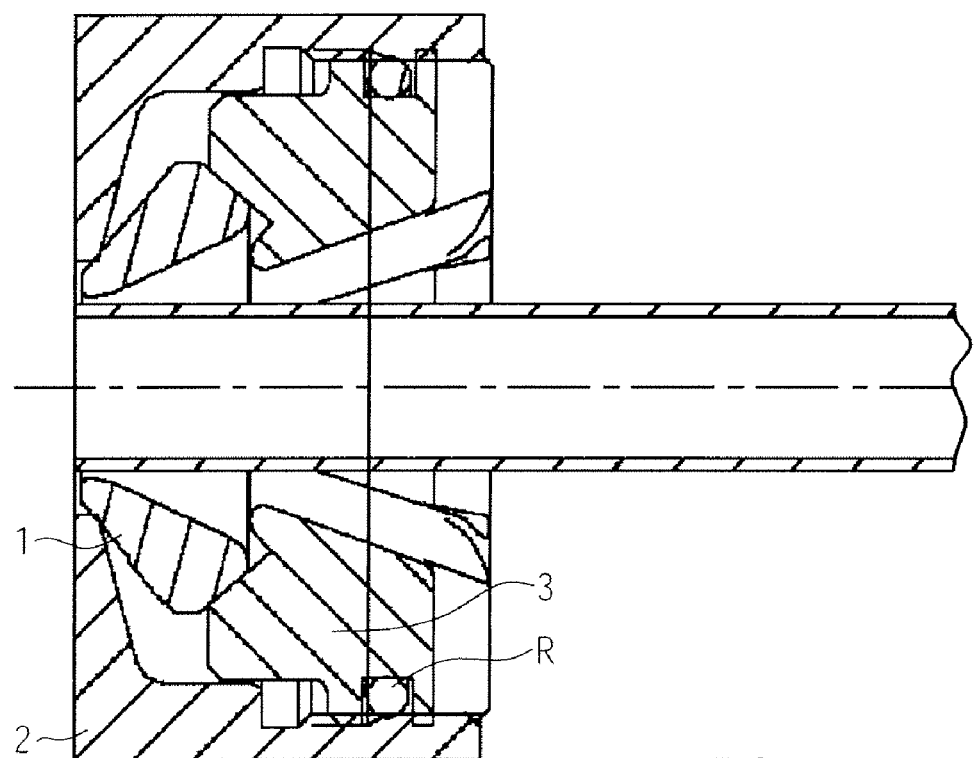
FIG. 13 shows a longitudinal section through a casing brake according to the prior art.

FIGS. 10 and 11 show a fourth embodiment of the present disclosure, which corresponds to the first embodiment with the exception that a frictional connection is here established between the locking element 5 and the inner or the outer shell. In correspondence with the first embodiment, the locking element 5 according to the present embodiment is fixed to the inner shell 3. Instead of the recess 6, a friction area 10 is here provided in the inner area of the outer shell 2. For example, a material 10, which extends around the inner circumference of the shell 2, is here applied. The material is of such a nature that high friction will be caused, i.e. a frictional connection will be established between the locking element 5 and the friction area 10. The friction area 10 is produced e.g. from an elastomer, whereas the locking element 5 is formed of a resilient or elastic material, as has been described hereinbefore. In the same way as in the above described embodiment, the frictional connection can be eliminated by pressing the actuating device 5c, as can especially be seen from FIG. 11, so that the two shells can then again be moved relative to one another, in particular by rotating said shells 2, 3 relative to one another. Instead of the continuous, circumferentially extending friction area, it is possible to provide a plurality of juxtaposed friction areas which are uniformly distributed over the circumference.

The embodiment used for establishing a frictional connection, which is shown in FIGS. 10 and 11, may also be modified in accordance with the embodiment shown in FIGS. 7 and 8, the locking element 5 being then arranged on the outer shell 2 and the friction area, instead of the recesses 6, being then arranged on the outer circumference of the inner shell 3.

The above described embodiments have been described in connection with a thread 11, the position which the two shells 2, 3 occupy relative to one another being established by rotating the shells. The axial adjustment of the two shells 2, 3 may, however, also be effected via two adjacent sliding surfaces of the two shells. To this end, the respective shell has provided thereon a plurality of arresting means, e.g. recesses, which are successively arranged in the axial direction or a friction area extending in the axial direction. The locking element can thus again establish a positive or a frictional connection with the respective inner or outer shell in such a way that a movement of the shells 2, 3 in the axial direction will no longer be possible.

In the following, the method according to the present disclosure will be explained in more detail making reference to FIGS. 1 to 4. For adjusting the casing brake, it will first be necessary to unlock the locking element 5 by operating the actuating device 5c. To this end, the projecting collar area 7 can be grasped all round, whereby the actuating device 5c will be pressed downwards in the direction of the arrow.

Alternatively to the actuating device 5c shown in FIG. 1, also a push button (round part) may be provided, said push button, when actuated, releasing the positive connection or the frictional connection. For releasing the positive or the frictional connection, a force of □100 N is necessary. While the actuating device remains pressed down, the shells can now be rotated relative to one another so as to adjust a certain pretension of the brake ring 1.

When the desired pretension has been obtained, the actuating device 5c will not be pressed down any longer. By briefly continuing the rotary movement, the portion 5b can then again snap into place at a locking position at the next possible site 6 (FIG. 2). The shells are now secured against rotation relative to one another about the longitudinal axis L. The thread 11 guarantees a holding effect in the axial direction. Hence, the braking pretension adjusted can be maintained for various calibers, i.e. a separate casing brake can be used for each caliber. The braking pretension adjusted can also be maintained when the brake is removed. The whole casing brake is then arrested in the brake ring gear unit by means of a snap fit.

The above described method can equally be applied to the other embodiments, the only difference being that in the embodiment shown in FIGS. 7 to 9 the actuating element has to be raised and in the embodiment shown in FIGS. 10 and 11 a frictional connection is established for the purpose of arresting.

The invention claimed is:

1. A casing brake comprising
  a brake ring;
  inner and outer shells between which the brake ring is tensioned;
  a locking element provided between the inner and outer shells, the locking element being connected to the inner or outer shell and establishing one of a positive or a frictional connection with the respective other shell at a locked position;
  an actuating device for eliminating the one of the positive or the frictional connection; and
  at least one of (a) through (e), as follows:
  (a) wherein the position which the inner and outer shells occupy relative to one another in the axial direction can be adjusted by means of a thread such that the tension of the brake ring can be adjusted by rotating the inner and outer shells relative to one another, such rotation of the inner and outer shells relative to one another being excluded at the locked position,
  (b) wherein the locking element is provided with a portion which, when occupying the locked position, applies pressure to a friction area provided in the respective inner or outer shell, a frictional connection being thereby established between the portion and the friction area,
  (c) wherein the locking element is provided with a portion which lockingly engages a recess formed in one of the inner or outer shell, thereby establishing a positive connection, wherein a plurality of recesses is uniformly distributed over the circumference of the inner or outer shell,
  (d) wherein the inner shell projects beyond the outer shell and has provided therein an opening through which the actuating device is exposed, and
  (e) wherein the inner shell projects beyond the outer shell and at least one sight opening is provided.

2. A casing brake according to claim 1, wherein the locking element is one of a resilient or an elastic element.

3. A casing brake according to claim 1, wherein one of the inner or outer shells is produced from a flexible material and the locking element is integrated in the shell.

4. A casing brake according to claim 1, wherein the actuating device can be operated by the force of human fingers.

5. A casing brake according to claim 4, wherein the actuating device can be operated by pressing or drawing.

6. A method of adjusting a casing brake according to claim 1, comprising:
  a) unlocking the locking element by operating the actuating device so as to eliminate a positive connection or the frictional connection between the locking element, which is connected to the inner or the outer shell, and the respective other shell;
  b) adjusting the pretension of the brake ring by changing the position of the shells relative to one another in an axial direction by rotating the inner and outer rings relative to one another by means of a thread, such rotation of the inner and outer shells relative to one another being excluded at the locked position; and c) locking the locking element, the locking element establishing then with the inner or outer shell the positive connection or the frictional connection such that the position of the shells relative to one another can no longer be changed.

7. A method according to claim 6, wherein in step b) the actuating device is operated still further, and that in step c) the actuating device is not operated.

8. A method according to claim 6, wherein the actuating device is operated by means of the force of human fingers.

9. A method according to claim 8, wherein the actuating device is operated by means of one of pressing or drawing the actuating device.

10. A method according to claim 6, wherein the force for operating the actuating device is ≦100 N.

11. A method according to claim 6, whereby adjusting the pretension of the brake ring comprises rotating the shells relative to one another.

12. A method according to claim 6, whereby the position of the shells relative to one another can no longer be changed comprises that the shells can no longer be rotated relative to one another.

13. A casing brake according to claim 1, wherein the locking element is provided with the portion which lockingly engages the recess formed in one of the inner or outer shell, thereby establishing the positive connection, and wherein the plurality of recesses is uniformly distributed over the circumference of the inner or outer shell, and wherein one or more friction areas are arranged so as to extend around the circumference of the inner or outer shell.

14. A method of adjusting a casing brake according to claim 1, comprising:

a) unlocking the locking element by operating the actuating device so as to eliminate a positive connection or the frictional connection between the locking element, which is connected to the inner or the outer shell, and the respective other shell;

b) adjusting the pretension of the brake ring by changing the position of the shells relative to one another in an axial direction; and c) locking the locking element by applying pressure with a portion of the locking element to a friction area provided in the respective inner or outer shell, thereby establishing a frictional connection between the portion and the friction area such that the position of the shells relative to one another can no longer be changed.

15. A method according to claim 14, wherein in step b) the actuating device is operated still further, and that in step c) the actuating device is not operated.

16. A method according to claim 14, wherein the actuating device is operated by means of the force of human fingers.

17. A method according to claim 16, wherein the actuating device is operated by means of one of pressing or drawing the actuating device.

18. A method according to claim 14, wherein the force for operating the actuating device is ≦100 N.

19. A method according to claim 14, whereby adjusting the pretension of the brake ring comprises rotating the shells relative to one another.

20. A method according to claim 14, whereby the position of the shells relative to one another can no longer be changed comprises that the shells can no longer be rotated relative to one another.

21. A method of adjusting a casing brake according to claim 1, comprising:

a) unlocking the locking element by operating the actuating device so as to eliminate a positive connection or the frictional connection between the locking element, which is connected to the inner or the outer shell, and the respective other shell;

b) adjusting the pretension of the brake ring by changing the position of the shells relative to one another in an axial direction; and c) locking the locking element by lockingly engaging a portion of the locking element with one of a plurality of recesses formed in and uniformly distributed over the circumference of the inner or outer shell, thereby establishing then with the inner or outer shell the positive connection such that the position of the shells relative to one another can no longer be changed.

22. A method according to claim 21, wherein in step b) the actuating device is operated still further, and that in step c) the actuating device is not operated.

23. A method according to claim 22, wherein the actuating device is operated by means of one of pressing or drawing the actuating device.

24. A method according to claim 21, wherein the actuating device is operated by means of the force of human fingers.

25. A method according to claim 21, wherein the force for operating the actuating device is ≦100 N.

26. A method according to claim 21, whereby adjusting the pretension of the brake ring comprises rotating the shells relative to one another.

27. A method according to claim 21, whereby the position of the shells relative to one another can no longer be changed comprises that the shells can no longer be rotated relative to one another.

28. A method of adjusting a casing brake according to claim 1, comprising:

a) unlocking the locking element by operating the actuating device through an opening in an area of the inner shell that projects beyond the outer shell so as to eliminate a positive connection or the frictional connection between the locking element, which is connected to the inner or the outer shell, and the respective other shell;

b) adjusting the pretension of the brake ring by changing the position of the shells relative to one another in an axial direction; and c) locking the locking element establishing then with the inner or outer shell the positive connection or the frictional connection such that the position of the shells relative to one another can no longer be changed.

29. A method according to claim 28, wherein in step b) the actuating device is operated still further, and that in step c) the actuating device is not operated.

30. A method according to claim 28, wherein the actuating device is operated by means of the force of human fingers.

31. A method according to claim 30, wherein the actuating device is operated by means of one of pressing or drawing the actuating device.

32. A method according to claim 28, wherein the force for operating the actuating device is ≦100 N.

33. A method according to claim 28, whereby adjusting the pretension of the brake ring comprises rotating the shells relative to one another.

34. A method according to claim 28, whereby the position of the shells relative to one another can no longer be changed comprises that the shells can no longer be rotated relative to one another.

35. A method of adjusting a casing brake according to claim 1, comprising:

a) unlocking the locking element by operating the actuating device so as to eliminate a positive connection or the frictional connection between the locking element, which is connected to the inner or the outer shell, and the respective other shell;
b) adjusting the pretension of the brake ring by changing the position of the shells relative to one another in an axial direction;
c) locking the locking element establishing then with the inner or outer shell the positive connection or the frictional connection such that the position of the shells relative to one another can no longer be changed; and
d) viewing a filling tube that is arranged concentrically with the casing brake through a sight opening disposed in an area of the inner shell that projects beyond the outer shell.

36. A method according to claim 35, wherein in step b) the actuating device is operated still further, and that in step c) the actuating device is not operated.

37. A method according to claim 35, wherein the actuating device is operated by means of the force of human fingers.

38. A method according to claim 37, wherein the actuating device is operated by means of one of pressing or drawing the actuating device.

39. A method according to claim 35, wherein the force for operating the actuating device is $\leqq 100$ N.

40. A method according to claim 35, whereby adjusting the pretension of the brake ring comprises rotating the shells relative to one another.

41. A method according to claim 35, whereby the position of the shells relative to one another can no longer be changed comprises that the shells can no longer be rotated relative to one another.

* * * * *